United States Patent [19]
Hurner

[11] Patent Number: 5,837,132
[45] Date of Patent: *Nov. 17, 1998

[54] FUEL SYSTEM WITH SIGHT-GLASS

[76] Inventor: Erwin E. Hurner, 920 Belsly Blvd. South, Moorhead, Minn. 56560

[*] Notice: This patent issued on a continued prosecution application filed under 37 CFR 1.53(d), and is subject to the twenty year patent term provisions of 35 U.S.C. 154(a)(2).

[21] Appl. No.: 802,307

[22] Filed: Feb. 18, 1997

Related U.S. Application Data

[60] Division of Ser. No. 376,420, Jan. 23, 1995, Pat. No. 5,682,661, which is a continuation-in-part of Ser. No. 176,641, Dec. 30, 1993, Pat. No. 5,471,964.

[51] Int. Cl.⁶ .................................................. B01D 35/143
[52] U.S. Cl. .......................... 210/95; 210/248; 210/249; 210/262
[58] Field of Search .............................. 210/94, 95, 248, 210/249, 259, 262, 311, 260; 73/323; 248/94; 116/276; 220/663; 165/DIG. 4

[56] References Cited

U.S. PATENT DOCUMENTS

| | | | |
|---|---|---|---|
| 2,287,670 | 6/1942 | Dever | 210/95 |
| 3,385,447 | 5/1968 | Bergstrom | 210/95 |
| 4,368,716 | 1/1983 | Davis | 210/184 |
| 4,395,996 | 8/1983 | Davis | 210/181 |
| 4,397,288 | 8/1983 | Kelling . | |
| 4,421,090 | 12/1983 | Davis | 210/184 |
| 4,428,351 | 1/1984 | Davis | 210/184 |
| 4,432,329 | 2/1984 | Rédélé . | |
| 4,454,851 | 6/1984 | Bourbonnaud et al. . | |
| 4,481,931 | 11/1984 | Bruner . | |
| 4,495,069 | 1/1985 | Davis | 210/114 |
| 4,502,450 | 3/1985 | Duprez . | |
| 4,539,109 | 9/1985 | Davis | 210/104 |
| 4,574,762 | 3/1986 | Muller et al. . | |
| 4,579,653 | 4/1986 | Davis | 210/86 |
| 4,612,897 | 9/1986 | Davis | 123/557 |
| 4,624,779 | 11/1986 | Hurner | 210/180 |
| 4,676,895 | 6/1987 | Davis | 210/184 |
| 4,680,110 | 7/1987 | Davis | 210/114 |
| 4,684,786 | 8/1987 | Mann et al. . | |
| 4,706,636 | 11/1987 | Davis | 123/557 |
| 4,748,960 | 6/1988 | Wolf . | |
| 4,807,584 | 2/1989 | Davis | 123/557 |
| 4,865,005 | 9/1989 | Griffith . | |
| 4,883,943 | 11/1989 | Davis | 392/486 |
| 4,986,907 | 1/1991 | Uzeta . | |
| 4,995,992 | 2/1991 | Hurner | 210/803 |
| 5,110,460 | 5/1992 | Gilas . | |
| 5,207,203 | 5/1993 | Wagner et al. . | |
| 5,378,358 | 1/1995 | Park | 210/305 |
| 5,471,964 | 12/1995 | Hurner | 123/514 |

*Primary Examiner*—Matthew O. Savage
*Attorney, Agent, or Firm*—Hardaway Law Firm, P.A.

[57] ABSTRACT

By providing a fuel treating system with a strategically positioned sight-glass, it is possible to replace an fuel filter without either spilling large amounts of fuel all over or allowing for air bubbles, which can degrade the lubricating system's operation and cause siphoning. The sight-glass is positioned above the fuel inlet and outlet passages but below the filter. Thus, as soon as no fuel is seen in the sight-glass, a mechanic knows that the fuel filter has been substantially emptied of fuel yet the fuel inlet and outlet are still full.

20 Claims, 2 Drawing Sheets

FUEL SYSTEM WITH SIGHT-GLASS

RELATED APPLICATION

This application is a divisional of U.S. patent application Ser. No. 06/376,420 filed on Jan. 23, 1995, now U.S. Pat. No. 5,682,661, which was a continuation-in-part of U.S. patent application Ser. No. 08/176,641 filed on Dec. 30, 1993, now U.S. Pat. No. 5,471,964.

BACKGROUND OF THE INVENTION

This invention relates generally to the art of fuel treatment and more particularly to an apparatus for making the process of changing a fuel filter cleaner, safer, and more reliable.

When changing a diesel fuel filter, two problems typically arise: (1) excess fuel spills all over the work area and onto the mechanic and (2) air bubbles enter into the fuel inlet and outlet lines. The first problem results in an unclean work environment detrimental to all, reduces the amount of fuel that can be recycled, and can violate the Environmental Protection Agency's (EPA) strict rules regarding the treatment of hazardous materials. The second problem, which results upon draining the system of its fuel, can seriously degrade the performance of the fuel system and lead to severe engine damage as well as lead to a siphoning effect wherein after the filter is removed large amounts of fuel flowing from the fuel inlet spill all over.

Thus, because fuel spillage and air bubbles are problems that need to be solved, there is room for improvement within the art.

OBJECTS OF THE INVENTION

It is thus an object of this invention to provide a novel apparatus that makes it easier, cleaner, and safer to replace a filer of an internal combustion engine.

It is a further object of this invention to provide an apparatus wherein the introduction of air bubbles into a fuel line is reduced during a fuel change and reliability is increased.

It is a still further object of this invention to provide an apparatus wherein the effects of siphoning during a fuel change are greatly reduced.

These and other objects are accomplished by: A fuel filter support head, comprising: a unitary block; the block having a fuel inlet passage, a fuel outlet passage, and a plurality of through passages; and a sight-glass structure in communication with at least one of the through passages; wherein a mechanic can see if any fuel is in the through passage by looking at the sight-glass.

DETAILED DESCRIPTION

It has been found in accordance with this invention that a fuel treatment apparatus having a fuel filter support head with a sight-glass thereon can be provided which allows a vehicle mechanic to determine when the fuel filter is drained of fuel and therefore can be removed. Various other advantages and features will become apparent from a reading of the following description given with reference to the various Figures of the drawings.

Figure 1:
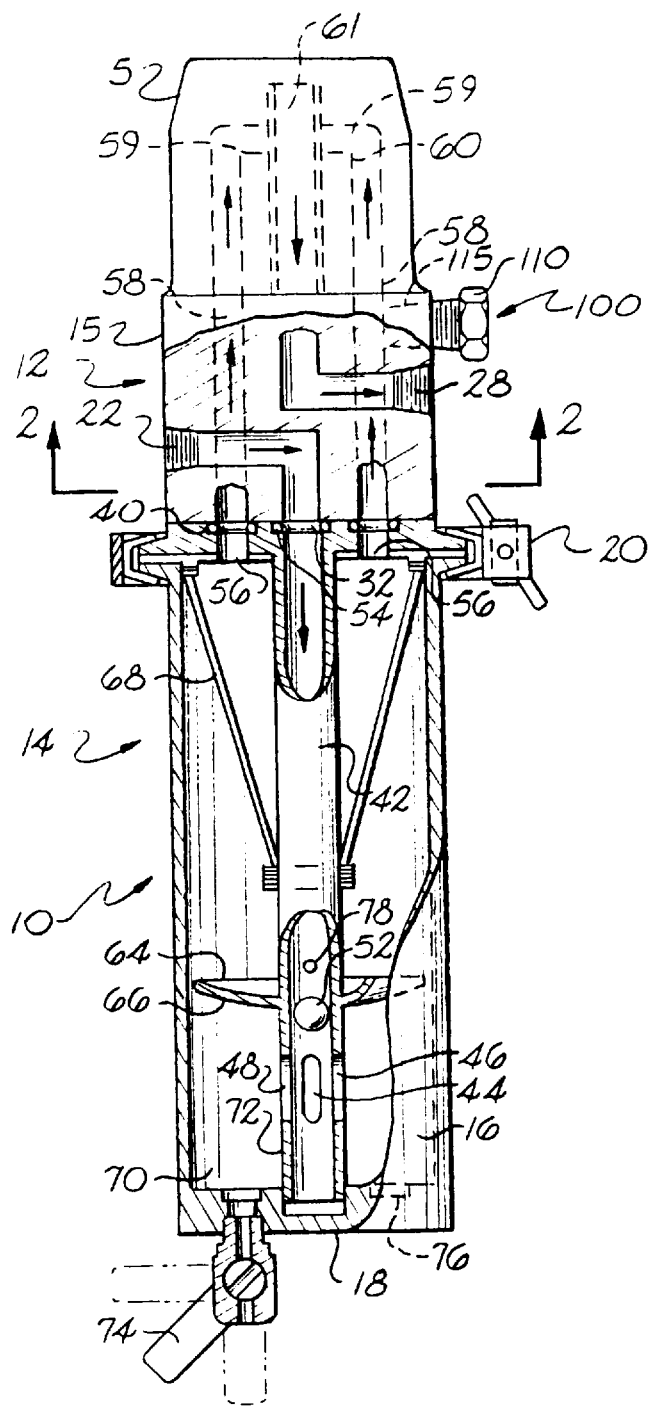
FIG. 1 of the drawings is a sectional view of a fuel treating apparatus having a sight glass in accordance with this invention.

FIG. 1 is a sectional view of a fuel treating apparatus 10 and is a sectional view of an otherwise generally cylindrical-shaped apparatus. Fuel treating apparatus 10 is part of the overall fuel system of an internal combustion engine. The structures illustrated in FIG. 1 are shown in the same plane for purposes of illustration and many of the details, such as hose fittings, are not shown.

Fuel treatment apparatus 10, substantially taught and disclosed in U.S. Pat. No. 4,995,992, the disclosure of which is hereby incorporated by reference, has a fuel filter support head 12 positioned thereon. When a conventional fuel filter 5 is screwed on fuel filter support head 12, filter 5 causes the fuel treating apparatus to become a closed system. The means by which filter 5 is sealingly mounted on support head 12 are conventional and not shown. Treatment apparatus 10 also defines a settling chamber including side wall 16 and bottom 18.

Figure 2:
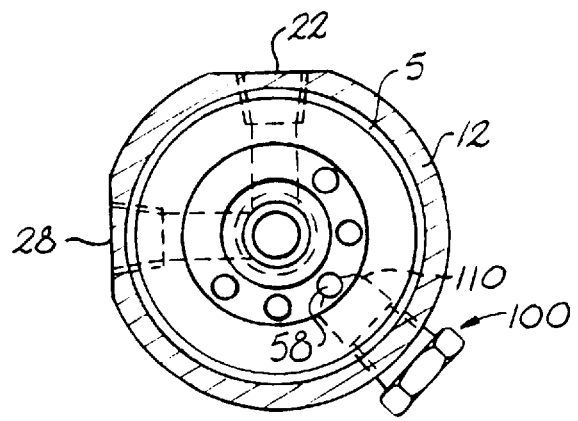
FIG. 2 of the drawings is a bottom plan view along line 2—2 of FIG. 1.

Support head 12 is preferably a unitary block structure 15 which is maintained in position on fuel treatment apparatus 10 by any conventional means such as clamping means 20 thereby forming a closed system within the fuel treatment apparatus 10. Support head 12 has a plurality of passages defined therein including inlet passage 22, outlet passage 28, and through passages 58. Through passages 58 comprise a series of passages circularly surrounding (FIG. 2) the coaxial portions of inlet passage 22 and outlet passage 28 (FIG. 1). Inlet passage 22 and outlet passage 28 have hose fittings (not shown) affixed thereto.

A conduit means 42 passes through the settling chamber of fuel treatment apparatus 10 in direct communication with inlet passage 22 of support head 12. Conduit means 42 defines a fuel inlet in the bottom of the chamber through slots 44 fully illustrated and 46 and 48 only partially illustrated.

It is seen that fuel travels from inlet passage 22 of support head 12 into and through conduit means 42 and out the fuel inlets 44, 46, 48, and 50 located in a lower portion of the settling chamber. Conduit means 42 has located therein a buoyant valve means 52 which during non-operation and a full fuel condition floats up conduit means 42 to a restriction 54 in the form of an O-ring sealing the conduit means within the chamber. Thus, in operation, the buoyant valve means 52 is forced down to permit the fuel to flow through conduit means 42 and out the fuel inlets 44, 46, 48, and 50, but upon non-operation of the fuel engine, the buoyant valve means 52 floats upwardly through conduit means 42 and prevents fuel from passing through inlet passage 22 of support-head 12 and to conduit means 42.

The floatation time between the bottom or lower portion of the chamber as illustrated in FIG. 1 of the drawings to contact restriction 54 has a lag time preferably of about four 4 seconds. During this lag time, any debris within the fuel passes down conduit means 42 such that upon contact of buoyant valve means 52 with restriction 54, no debris remains to adversely affect the seal between buoyant valve means 52 and restriction 54.

Buoyant valve means 52 is illustrated here in the form of a metallic hollow shell ball of much the same form as a ping-pong ball so as to be buoyant within diesel fuel.

Thus, during normal operation, fuel from the tank enters support head 12 at inlet passage 22 and continues until exiting support head 12 through opening 32 which communicates with conduit means 42. Fuel passing through conduit means 42 contacts buoyant valve means 52 and forces it into a lower position. The fuel passes through fuel inlets 44, 46, 48, and 50 and then is treated by spreader 64 defining a drain orifice 66 therein and a water fuel separator 68. These components are well described in U.S. Pat. No. 4,624,779, the disclosure which is hereby incorporated by reference. The fuel passes from the chamber through exit passages. 56 in apparatus 10 and which are in the same circular configuration of through passages 58, through passages 58 within support head 12, and into filter 5 through filter passages 59, inline with through passages 58. Filter passages 59 circularly surround central passage 60 of fuel filter 5. From filter passages 59, the fuel passes through the filtering portion 61 of conventional fuel filter 5, and then down through central passage 60, and through outlet 28 for use in a combustion engine.

During normal operation, moisture and other debris accumulate the bottom of the settling chamber, for example, at 70. Conduit means 42 has a means 72 therein to permit communication of moisture and debris with the bottom portion 70 of the settling chamber.

Located in the bottom of the settling chamber is drain 74. The location of drain means 74 within recess 76 greatly enhances the ability to drain water and fuel from the system. Recess 76 is in the form of an annulus in the bottom of the settling chamber. In actual operation, water droplets appear almost magnetically attracted to recess 76 for drainage through drain means 74.

During the fuel filter changing and draining process, as described above, it is very important that the following two things do not occur: (1) excess fuel spills all over the work area and onto the mechanic and (2) air bubbles enter into the fuel inlet passage 22 and outlet passage 28. Accordingly, when using drain 74, it cannot be merely opened and left until fuel has stopped dripping. If that method is used, substantial pockets of air will be left in the various fuel lines to cause the problems described above.

Figure 3:
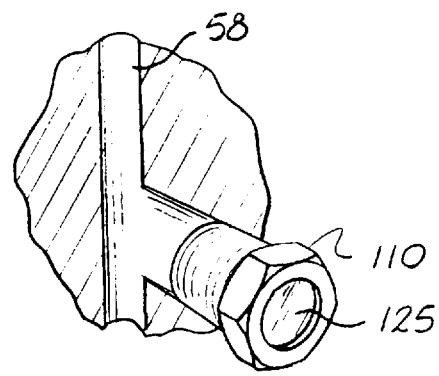
FIG. 3 of the drawings is an elevational view of the sight-glass structure in accordance with this invention.

To allow a mechanic to determine when fuel filter 5 is empty of fuel, the instant invention incorporates a sight-glass 100 into support head 12. Sight-glass 100 comprises a hollow casing 110 having an open first end and a second end sealingly closed by a piece of transparent material 125, such as glass (FIG. 3). Bore 115, in which casing 110 sealingly fits, is in fluid communication with one of the through passages 58 so support head 12. During operation, when fuel is flowing through support head 12, fuel will flow into bore 115 through casing 110, and against glass 125, whereby a mechanic can see the fuel. It is also possible for casing 110 to be have a bolt head at the closed end thereof and threads along casing 110's outer surface complementary to threads in bore 115, allowing for the sight-glass 100 to be screwed in and out of place for easy replacement.

When fuel filter 5 is to be replaced with a new fuel filter, before removing the old filter, the mechanic must be sure that it is substantially empty of fuel. The mechanic will open drain 74; letting fuel start to flow out of the closed system. The mechanic will watch sight-glass 100 until he no longer sees any fuel at glass 125. At that point, filter 5 should be empty of fuel, yet inlet passage 22 and outlet passage 28 should still be filled with fuel due to their positions below sight-glass 100. The mechanic will close drain 74 and remove fuel filter 5 with only minimal spillage of excess fuel adhering to the inside of filter 5. A new filter is then put in place of the old filter. Because inlet 22 and outlet 28 are never emptied of fuel, no air bubbles will enter into the system and thus there will be no degradation in the operation of the lubricating system nor any siphoning effect. This is especially true due to the extremely small volume of air which may be in the filter.

It is thus seen how the above structure provides a novel apparatus that makes it easier, cleaner, and safer to replace the fuel filter of an internal combustion engine. It is further seen how this invention provides an apparatus wherein the introduction of air bubbles into a fuel line is reduced during a fuel change and reliability is increased. It is further seen how this invention provides an apparatus wherein the effects of siphoning during an fuel change are greatly reduced. It is further seen how this invention provides an apparatus wherein by use of a sight glass, a mechanic can determine when the level of fuel has dropped to the required level.

The above description is given in reference to a fuel system with a sight-glass. However, it is understood that many variations are apparent to one of ordinary skill in the art from a reading of the above specification and such variations are within the spirit and scope of the instant invention as defined by the following appended claims.

That which is claimed:

1. A fuel filter support head, comprising:
   a unitary block, comprising:
      opposite upper and lower surfaces;
      an outer peripheral surface extending between said upper and lower surfaces;
      a first passage extending through said block from said outer peripheral surface to said upper surface;
      a second passage, separate from said first passage, extending through said block from said outer peripheral surface to said lower surface;
      at least one through passage, separate from said first and second passages, extending from said upper surface to said lower surface; and
      a bore extending from said outer peripheral surface to said at least one through passage; and
   a sight glass structure positioned adjacent said outer peripheral surface and extending into said bore;
   wherein a mechanic can see if any fuel is in said through passage by looking at said sight glass.

2. The fuel filter support head as recited in claim 1, wherein said at least one through passage is substantially vertical.

3. The fuel filter support head as recited in claim 1, wherein said first passage, said second passage, and said at least one through passage are bores in said block.

4. The fuel filter support head as recited in claim 1, wherein said at least one through passage comprises a plurality of through passages.

5. The fuel filter support head as recited in claim 4, said plurality of through passages are circularly arranged in said block.

6. The fuel filter support head as recited in claim 4, wherein each one of said plurality of through passages are substantially parallel to the other of said plurality of through passages.

7. The fuel filter support head as recited in claim 1, wherein said first and second passages each have a substantially horizontal portion.

8. The fuel filter support head as recited in claim 7, wherein said sight glass is positioned at an elevation above an elevation of said horizontal portion of said first passage and above an elevation of said horizontal portion of said second passage.

9. The fuel filter support head as recited in claim 7, wherein said horizontal portion of said first passage is positioned at an elevation above an elevation of said horizontal portion of said second passage.

10. The fuel filter support head as recited in claim 1, wherein said block is substantially cylindrical.

11. The fuel filter support head as recited in claim 1, wherein said first and second passages each have a substantially vertical portion.

12. The fuel filter support head as recited in claim 11, wherein said sight glass is positioned at an elevation above an elevation of said vertical portion of said second passage.

13. The fuel filter support head as recited in claim 11, wherein said vertical portions of said first and second passages are coaxial.

14. The fuel filter support head as recited in claim 11, wherein said vertical portion of said first passage is positioned at an elevation above an elevation of said vertical portion of said second passage.

15. The fuel filter support head as recited in claim 11, wherein said at least one through passage comprises a plurality of through passages circularly surrounding said vertical portion of said first and second passages.

16. The fuel filter support head as recited in claim 1, wherein said first passage is a fuel outlet and said second passage is a fuel inlet.

17. The fuel filter support head as recited in claim 1, wherein said upper and lower surfaces are substantially flat.

18. The fuel filter support head as recited in claim 1, wherein said first and second passages are threaded.

19. The fuel filter support head as recited in claim 1, wherein said sight glass structure comprises:
    a hollow casing having:
        an open first end in communication with said bore; and
        an opposite second end; and
    a transparent material sealing said second end.

20. The fuel filter support head as recited in claim 19, wherein said transparent material comprises glass.

\* \* \* \* \*